(12) United States Patent
Grandjean et al.

(10) Patent No.: US 6,476,350 B1
(45) Date of Patent: Nov. 5, 2002

(54) DEVICE AND METHOD FOR EXTENDED DISTANCE CUTTING BY LASER, IN PULSE MODE

(75) Inventors: Jean-Paul Grandjean, Sabran (FR); Jean-Marc Dufaud, Ners (FR); Jean-Pascal Alfille, Clamart (FR); Patrick Meyrueis, Strasbourg (FR); Patrice Twardowski, Roche Du Polygane (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 09/462,875

(22) PCT Filed: Jul. 17, 1998

(86) PCT No.: PCT/FR98/01571

§ 371 (c)(1),
(2), (4) Date: Mar. 29, 2000

(87) PCT Pub. No.: WO99/03636

PCT Pub. Date: Jan. 28, 1999

(30) Foreign Application Priority Data

Jul. 18, 1997 (FR) .............................. 97 09157

(51) Int. Cl.[7] ........................ B23K 26/18; B23K 26/00; B23K 26/16
(52) U.S. Cl. ............................ 219/121.69; 219/121.67; 219/121.7; 219/121.22
(58) Field of Search .................... 219/121.7–121.72, 219/121.67, 121.69; 606/10, 2

(56) References Cited

U.S. PATENT DOCUMENTS

| 4,654,949 A | * | 4/1987 | Pryor ........................ 29/407 |
| 4,870,244 A | | 9/1989 | Copley et al. |
| 5,053,006 A | * | 10/1991 | Watson ...................... 604/52 |
| 5,289,553 A | * | 2/1994 | Ortiz, Jr. et al. .............. 385/74 |
| 5,349,590 A | * | 9/1994 | Amirkhanian et al. .......... 372/6 |
| 5,520,679 A | * | 5/1996 | Lin ............................... 606/5 |
| 5,578,229 A | * | 11/1996 | Barnekov et al. ...... 219/121.72 |
| 5,670,068 A | * | 9/1997 | Kuriyama et al. ..... 219/121.68 |
| 5,674,632 A | * | 10/1997 | Ahern et al. ................ 428/612 |
| 5,718,231 A | * | 2/1998 | Dewhurst et al. ...... 128/662.06 |
| 5,739,502 A | * | 4/1998 | Anderson et al. ...... 219/121.71 |

(List continued on next page.)

FOREIGN PATENT DOCUMENTS

WO WO-97/43682 * 11/1997 ................. 359/566

OTHER PUBLICATIONS

Abstract: Verboven, "Pulsed kilowatt Nd:YAG lser fibre optic beam delivery", pp. 416–425, SPIE vol. 2206, Apr. 1994.*

Abstract: Verboven, "Pulsed kilowatt Nd: YAG laser with fibre optic beam delivery," pp. 416–425, SPIE vol. 2206.

Abstract: Alfillé, "Thick Cutting of Metallic Material for Nuclear Dismantling Applications with Pulsed YAG Laser," Copyright 1997 by ASME.

Primary Examiner—M. Alexandra Elve
Assistant Examiner—L. Edmondson
(74) Attorney, Agent, or Firm—Thelen Reid & Priest LLP; Robert E. Krebs

(57) ABSTRACT

The invention relates to a device for laser cutting, having:

means (2) for emitting a pulsed laser beam, with energy pulses $E \geq 10$ joules, at least one optical fiber (4) for transmitting the laser pulses, from the means of emitting the laser beam in the direction of a piece (6) to be cut, means of focusing the laser beam.

The invention also relates to a method for the laser cutting, at a distance, of a piece to be cut.

Application to the dismantling and/or taking apart of an installation.

6 Claims, 2 Drawing Sheets

U.S. PATENT DOCUMENTS

| | | | |
|---|---|---|---|
| 5,905,832 A | * 5/1999 | Alfille et al. | 385/92 |
| 5,909,280 A | * 6/1999 | Zavracky | 356/352 |
| 5,917,185 A | * 6/1999 | Yeung et al. | 250/288 |
| 6,056,738 A | * 5/2000 | Marchitto et al. | 606/2 |
| 6,096,031 A | * 8/2000 | Mitchell et al. | 606/15 |
| 6,156,030 A | * 12/2000 | Neev | 606/10 |
| 6,198,069 B1 | * 3/2001 | Hackel et al. | 219/121.6 |
| 6,236,509 B1 | * 5/2001 | Grandjean et al. | 359/566 |

* cited by examiner

DEVICE AND METHOD FOR EXTENDED DISTANCE CUTTING BY LASER, IN PULSE MODE

TECHNICAL FIELD AND PRIOR ART

The invention relates to the field of cutting by laser, in particular with a view to applications to dismantling and/or taking apart.

The technique of dismantling, or taking apart, by laser is distinguished from laser machining by a certain number of characteristics.

Laser machining is effected using a simple physical phenomenon: light of any colour, with a sufficiently high energy level, applied for a sufficiently long time to a target, causes the latter to melt and vaporises the matter or destructures it (in the case of UV lasers). Laser machining makes it possible to perform manufacturing operations which are generally followed by assembly steps themselves making it possible to implement the laser technique (welding, surface treatment, localised alloying, milling).

Thus production laser machining machines comprising laser sources have been produced and sold mainly by machine tool manufacturers. These machines make it possible to process materials in an optimised manner, which makes the machining operations more precise, more rapid, more repetitive, whilst ensuring a very good level of quality for the machined parts.

These techniques use procedures complementary to the emission and control of the laser light proper, and notably the ejection of added gas at the point of impact of the laser beam, in order to eliminate impurities from the area to be treated, to improve the precision of the cutting, to protect the optical devices situated close to the area of impact of the laser on the material, and to create a gaseous microenvironment in the cutting area in order to control the process.

In the case of dismantling or taking apart by laser, the objects to be achieved for a cutting machine are, a priori, very different. It appears in fact that it suffices, for the dismantling operation to be satisfactory, for the size of the cut pieces to correspond to that required by the packing devices allowing the removal of the said cut pieces.

In addition, it cannot be envisaged, in dismantling devices, using appliances making it possible to send an added gas to the area of impact of the laser beam. This is because such appliances should, if they were used, be situated close to the piece to be cut. However, this cannot be envisaged in the case of dismantling, since the laser firing, for reasons of conditions of operation of demolition sites, must be carried out in compliance with a distance between the lens and the piece to be cut, because of the size of the working area (around 1 to 2 m). The laser machines used for dismantling are therefore not very different, in their operating mode, from those used for production of machining.

In addition, a dismantling laser machine is not intended to work, as in the workshop, under stable conditions, but must rather operate under site conditions: it therefore preferably "basic", compact, lightweight. Controlling the machine is also, preferably, easier than in the case of a workshop machine.

A cutting device is known through the document U.S. Pat. No. 4 870 244. The teachings of this document are based on the use of a biphotonic effect, that is to say on the emission of a first laser radiation which is continuous, or pulsed and relaxed, which melts the material, followed by the emission of a laser pulse of the "Q-switch" type focused on the target constituting the area melted by the first laser, which discharges the material by detonation effect. The use of this method assumes that coordination of the laser pulses is possible and is sufficiently precise to prevent the molten material resolidifying between the two laser pulses, the Q-switch not being able to operate industrially both synchronously and at high power.

According to a variant, this document teaches that the two lasers can be replaced by a single laser operating alternatively in a relaxed mode and in Q-switch switch triggered mode. However, it is clearly stated that, because of the interval of time necessary between the end of functioning in continuous mode and the start of the pulse, a cooling of the molten material on the target may take place, which limits the possibilities of application of this device, or of this method, to targets requiring only low cutting powers (thickness of material probably less than 0.1 mm for steel).

This document does not therefore describe a device which can be used, in a practical fashion, in industrial dismantling operations, having regard to the conditions of simplicity and compactness which this application requires and which have been measured above: this is because the system with two lasers is complex (it uses synchronisation), whilst the system with a single laser is very tricky to apply and of limited application. In all cases the Q-switch technology limits the power of the process.

In addition, through the Q-switch technique used in this document U.S. Pat. No. 4 870 244, the pulses obtained are difficult to program with regard to time in repetitive mode.

Consequently at the present time a laser cutting device is not known which does not use ejection of added gas on the laser impact area, and which remains, at the same time, simple and flexible in use.

In addition, the current techniques of dismantling by laser which generally operate in the workshop, or in a pilot laboratory with added gas, do not make it possible to effect, without added gas, cutting of material having a great thickness (at least 10 mm). An additional problem is posed because of the presence, during raw cutting, of wastes such as gases, or deposits of the metallic ball type.

DISCLOSURE OF THE INVENTION

The invention therefore proposes a laser cutting system which remains simple in structure and use, compatible with applications in the field of dismantling, using no added gas, and being able to operate at distances of several meters between the lens and the piece to be cut.

In addition, even if, as stated above, the degrees of precision or evenness in the cutting are not, a priori, as critical as in the field of machining, the invention proposes a device for obtaining quality cutting. This has two consequences: it becomes possible to effect cuts with a greater thickness (cm), and it is possible to eliminate secondary waste such as deposits in the form, for example, of metallic balls, and to reduce the volume of aerosols or cutting gases produced.

More precisely, the object of the invention is a device for laser cutting, having:
- means for emitting a pulsed laser beam, with energy pulses $E \geq 10$ joules,
- at least one optical fibre for transmitting the laser pulses, from the means of emitting the laser beam in the direction of a piece to be cut,
- means of focusing the laser beam, with a focal distance $f \geq 50$ cm.

Transmission of the beam by means of an optical fibre makes it possible to operate at a distance. In addition, this method does not use the ejection of added gas, at the area of impact of the laser beam. The use of a focusing lens with a large focal distance (f≧50 cm or 1 m) make it possible to operate at a distance between the lens and the piece to be cut.

The focusing means include an assembly of lenses or one aspheric lens with an index gradient or a telescope. They can also include a hybrid mixture of diffractive and refractive elements.

The power density necessary with regard to the task of focusing the laser beam used without added gas, in accordance with the invention, can be less than that necessary for a conventional laser cutting.

For focusing distances greater than one meter, not using the diffractive lens, a telescope is used with a centred mirror which has the drawback of high diffraction at the edges of the lenses, but with satisfactory astigmatism, or a decentred mirror, which eliminates the diffraction but focuses the beam elliptically along two axes.

Using a laser operating in pulse mode makes it possible to create a high-energy pulsed plasma in the vicinity of the impact area on the piece to be cut. It is because the consequence of the laser pulse is to add to the heating of the material a blast effect which makes it possible to omit the assistance gas used in conventional industrial applications, or the second Q-switch described in U.S. Pat. No. 4 870 244. This blast effect is explained by the quality of the plasma, with high energy, created by the laser pulses.

This plasma has another positive effect on the cutting: it allows autofocusing of the beam in the thickness of the material cut. This explains why, in spite of the absence of assistance gas, cuts of very good quality are obtained (the kerves are very fine, with a size substantially identical to the diameter of the focal spot, and with parallel edges) and deep (it becomes possible to cut thick materials). Obtaining fine kerves also makes it possible to reduce the secondary waste produced, such as the gases or deposits of the metallic ball type, and therefore to avoid the rapid dirtying of the focusing means present at the output of the optical fibre.

The invention preferably uses a single laser mode (relaxed mode) which makes it possible to obtain modal stability, a garantee of the uniformity of the coupling for the cutting even on a site.

Control of a laser in pulse mode is easy: the height, width and spacing of the pulses are adjustable. It is therefore possible to optimise the cutting operations according to the context, given the effect of these pulse parameters on the spatio-temporal physics of the plasma created in the vicinity of the impact area. For example, if the cutting is effected on small thicknesses, it is not necessary to send very high energy pulses.

Means of focusing the laser beam are situated at the end of the optical fibre or fibres.

The end of the optical fibre intended to convey the laser energy to the part to be cut can form part of a cutting head which may be orientable.

Means can also be provided for assessing the distance between the cutting head and the piece to be cut. These means can include, for example, a camera, and/or a range finder and/or a profile meter.

It is also possible to provide means of controlling the position of the cutting head and/or means of controlling the focusing of the beam.

Moreover, means can be provided for moving the cutting head. Thus, in the case of a piece to be cut which it is not possible to move, it is the end of the cutting head itself which is moved. These movement means can for example include one or more robotised arms, or movement devices with one or two axes whose speed and position are servo-controlled.

The means emitting a laser beam which can be used in the context of an application of the dismantling type are preferably lasers of the YAG-Nd or iodine-oxygen type.

Another object of the invention is a method for the laser cutting of a piece to be cut including:

the emission of laser pulses, with an energy of E≧10 joules, the transmission of these laser pulses by at least one optical fibre, in the direction of a piece to be cut, the focusing of the laser beam onto the said piece to be cut, by means of a focusing device with a focal distance f≧50 cm.

This method makes it possible to resolve the problems which have already been discussed above, with the same advantages as those mentioned above in relation to the description of the device.

According to a particular embodiment of this method, the distance between the piece to be cut and the end of the cutting head intended to be turned towards the piece to be cut can be assessed. It is also possible to control the position of the end of the cutting head and/or the focusing of the beam.

Another object of the invention is a method as described above using a device as described above.

BRIEF DESCRIPTION OF THE FIGURES

In any event, the characteristics and advantages of the invention will emerge more clearly in the light of the following description. This description relates. to the example embodiments, given for explanation and in no way limitatively, referring to the accompanying drawings, in which.

DETAILED DESCRIPTION OF EMBODIMENTS OF THE INVENTION

Figure 1:
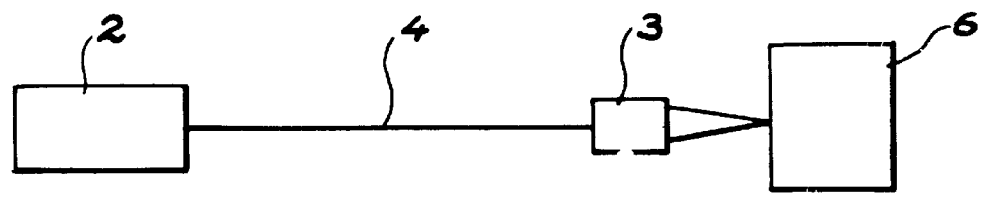
FIG. 1 depicts an outline diagram of the device according to the invention.

An outline diagram of the invention is depicted in FIG. 1. The reference 2 designates a laser source, operating in pulsed relaxed mode. An optical fibre 4 makes it possible to transmit the laser pulses in the direction of a piece to be cut 6. Focusing means 3 focus the laser beam onto the surface of the piece to be cut.

Figure 2:
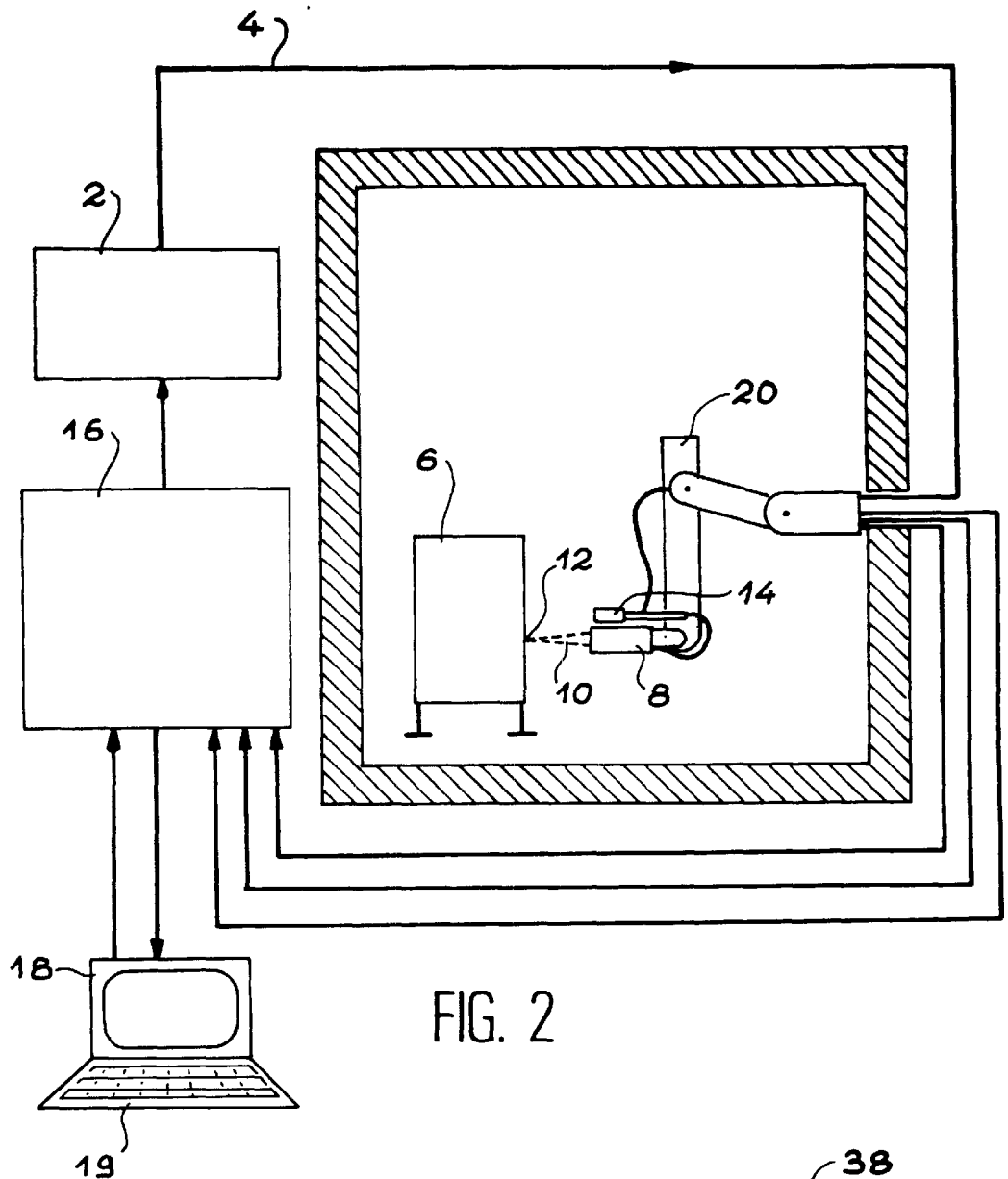
FIG. 2 depicts an example of implementation of the invention.

One implementation of the invention will be described in relation to FIG. 2, in which the reference 2 designates the laser source, for example an Nd:YAG power source which can be used in pulsed mode and whose pulses can be parameterised for frequency, energy and duration. Current Nd:YAG sources deliver powers which can range currently up to approximately 5 kW: the progress achieved on these sources will subsequently make it possible to use higher powers in relation to the invention. One or more optical filters 4 afford transportation of the radiation issuing from the pulsed laser source in the direction of the piece to be cut 6, situated at a distance. In the case of dismantling operations, such a distance can achieve about a hundred meters. The beam 10 is then projected in the direction of the piece 6, the end of the optical fibre being able to be held, for example, in a cutting head 8. Means, not shown in the figure, allow focusing of the laser beam 10 at an impact area 12, close to the surface of the piece to be cut. These focusing means, with a fixed or variable focal distance, can be incorporated into the cutting head 8.

The focusing means provided make it possible to work at a distance, for example at a distance of around 1 meter.

In order to obtain the maximum cutting power, a lens is preferably chosen adapted to the large opening of the beam at the output of the optical fibre.

Figure 3:
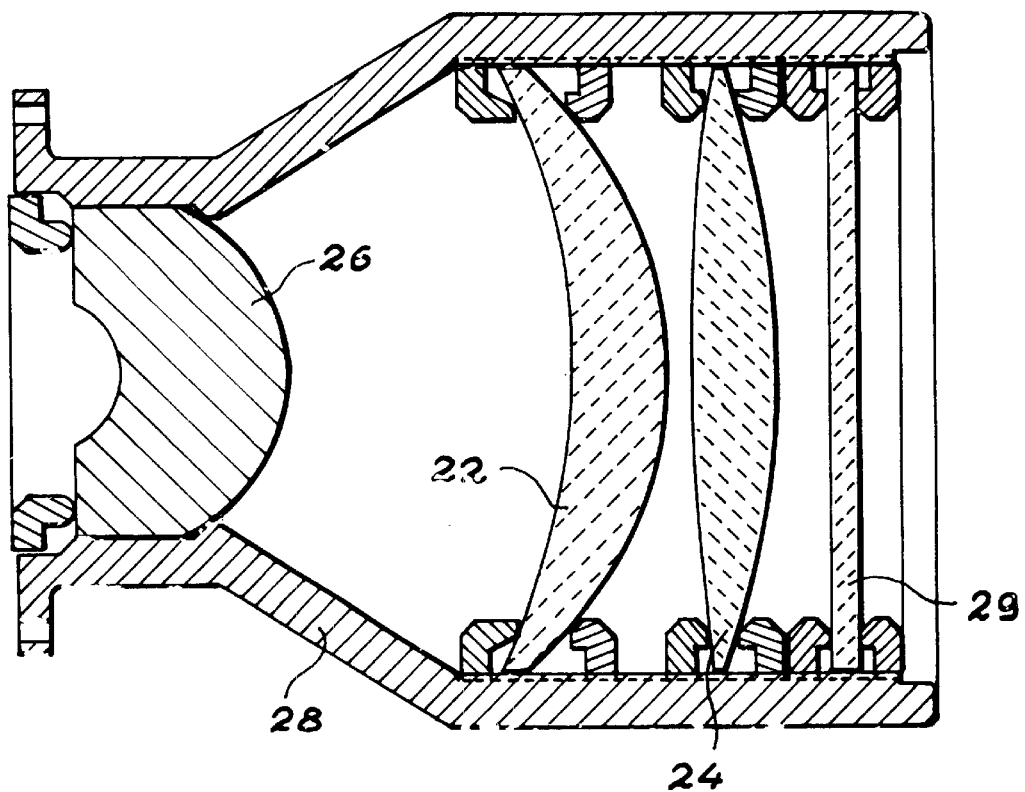
FIG. 3 is a focusing device for a device according to the invention.

A focusing system suited to the application envisaged is that shown diagrammatically in FIG. 3. It includes three lenses 22, 24, 26. These elements are aligned and centred with respect to each other, and are protected from external attacks by being mounted in a barrel 28 and by a protective port 29. The barrel mounting allows precise positioning. The combination of three lenses reduces. the focusing task, and therefore affords sufficient cutting power, as well as a reduction in the dimensions of the system (whence limited bulk).

In the mounting in FIG. 3, the optical fibre brings the laser beam onto a divergent meniscal lens which increases the angle of opening of the beam. Another lens, with two diopters, is associated with the meniscal lens. A system with three elements is therefore obtained, to which a protective port can be added.

It is possible to use a standard material for producing the lenses (for example the material "BK7").

Using the MTF (modulation transfer function) method, it is shown that the quality of the focusing decreases if the optical fibre moves away, in its mounting, from the optical axis of the system: it is therefore preferable for the optical fibre to be centred on the axis with a precision of $5/10^{th}$ of a mm or $2/10^{th}$ or $3/10^{th}$ or better still $1/10^{th}$ of a mm.

In order to keep a focusing spot diameter substantially equal to the diameter of the optical fibre, a focusing system is chosen such that the beam, at its exit, has approximately the same divergence as at the exit from the optical fibre. Thus, in order to keep a focusing spot of 1 mm, a beam is taken having, at the output from the focusing system, an angle of approximately 7° for example: this gives rise, for a focusing of one meter, to a focusing system diameter of around 250 mm, at a minimum.

Means 14, including for example a camera and/or a range finder and/or a profile meter, can be provided close to the head 8 or at the end of the optical fibre or fibres 4, so as to allow assessment of the distance to the surface of the piece. The data transmitted from the means 14 can be analysed in a control device 16 provided for this purpose. A device for controlling the pulses (frequency, duration, energy etc) of the laser source 2 can be provided, it can for example be. integrated into the control device 16. This device can include, for example, a microcomputer or conventional microprocessor suitably programmed for analysing the data. The appropriate program instructions can be recorded on a magnetic disk or on conventional units of the RAM or ROM type. Moreover, means 18 of displaying the analysed data or of the image displayed by means of the camera can also be provided, an operator if necessary being able to introduce control or command data by means of a keyboard 19 or control station. The operator can thus make a decision with regard to the need to move the cutting head, and/or the focusing means, with respect to the surface of the piece 6.

Means of controlling the position of the end of the fibre and/or of the means of controlling the focusing of the beam can also be provided; in particular, provision can be made for an automatic movement of the cutting head and/or of the focusing means when a certain distance, for example between the end of the cutting head and the surface of the piece 6 to be cut, has been measured and it is established by comparison means or when the operator finds that this measured or assessed distance is, by an excessively large margin, distant from a certain predetermined distance, previously recorded, for example in the memory means mentioned above.

Moreover, it is often preferable to move the cutting head with respect to the piece, rather than the converse, in order to produce a cutting groove. This is because the piece is often bulky, it may for example be a part of a nuclear installation. In this case, means of moving the cutting head along a path able to be controlled by the operator can be provided. Thus, in the example depicted in FIG. 2, a cutting head 8 incorporates the end of the fibre, and this cutting head is moved with respect to the piece by means of a robotised arm 20 allowing various movements in space (translation, pivoting with respect to certain axes).

According to another example, the end of the fibre can be moved by means of a table allowing movements in one or two directions in space.

The control of a robotised arm 20, or of a table, can be effected at a distance by means of a control console 16 and interactive control means 18, 19. In this type of control, it may also be advantageous to be able to vary the speed of movement of the head with respect to the piece to be cut.

Figure 4:
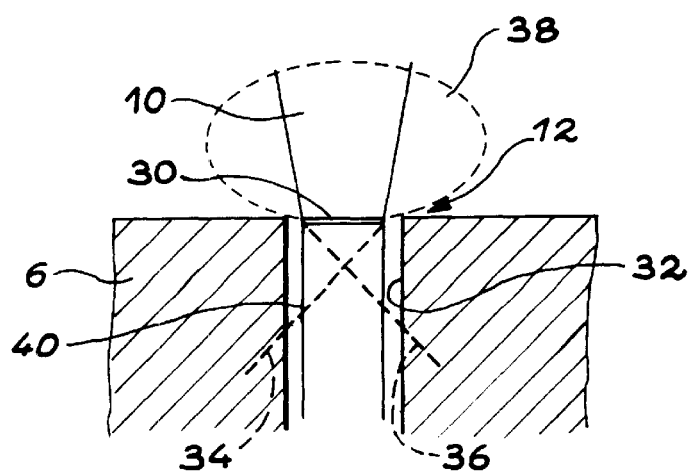
FIG. 4 depicts schematically a piece to be cut and an incident laser beam, obtained with a device according to the invention.

FIG. 4 depicts, to an enlarged scale, the impact of a cutting laser beam 10 at the piece to be cut 6. The reference 30 designates the focal spot, which it is possible to vary by varying the parameters of the focusing means. The reference 32 designates the kerf obtained. The dotted lines 34 and 36 delimit the theoretical divergence of the beam. This is because the cutting of a surface area of the piece 6 initiates the duration of a plasma 38 at the level of, or above, the cutting area. The plasma obtained by the cutting technique according to the invention has very high energy, and makes it possible to create a blast effect with the molten material, which makes it possible to replace the assistance gas used in the conventional industrial applications. This plasma 38 has another positive effect on the cutting: it allows autofocusing of the beam 10 in the thickness of the material cut. This is because the beam does not have the theoretical divergence delimited by the lines 34–36, but is rather parallel and propagates in the direction 40. Thus a very good cutting quality is obtained, and it is this autofocusing effect which makes it possible to explain on the one hand the fineness of kerves with very parallel edges, with a size substantially identical to the diameter of the focal spot 30, and this in spite of the absence of any assistance gas, and, on the other hand, the great cutting depth which can be obtained (approximately 20 mm).

Functioning in pulse mode, still because of the creation of a plasma 38, allows greater tolerance on the other cutting parameters: for example, the precision of the focusing is not very critical, in any event less than in the technique used in an added gas. The plasma makes it possible to have a greater energy density, and there is less need to slave the focusing, because of the autofocusing of the beam.

The laser-material interaction plasma, in the context of a cutting process according to the invention, has contradictory effects, which are tentatively separated during a cutting-operation. On the one hand, it favours the coupling of the energy of the laser beam to the irradiated piece as long as it remains in contact with the latter, or very close to its surface. It is then transparent to the laser beam. Moreover, it becomes opaque to the laser beam as soon as it detaches itself from it, which occurs at a given moment and at a given power: it then becomes optically thick.

The optically thin plasma makes energy exchanges with the ambient environment through heat conduction, radiative transfer and shock wave. The latter is very similar to an absorption wave, since it propagates in the direction opposite that of the laser in the following modes:

a) first of all, in combustion wave mode, b) then in detonation wave mode, c) finally, in radiation wave mode.

The combustion wave is the propagation mode which acts first of all when the incident power I is between $10^4$ and $10^6$ W/cm$^2$ in ambient air. The transfer of energy then mainly occurs through conduction and radiation. In this case, a shock wave precedes the absorption front, but the temperature of the ambient gas remains sufficiently low for it to be transparent to the laser radiation. The speed of propagation of the combustion wave therefore becomes mainly a function of the absorbing capacity of the plasma.

Subsequently, the combustion wave which arises in the vapour of the impact area transfers its energy to the surrounding air. This air then absorbs a large proportion of the laser energy thus transferred. This also causes a significant heating of the target, and therefore a considerable additional increase in its temperature.

The detonation wave appears for I>$10^7$ W/cm$^2$ in the ambient air, when the pressure front is no longer. separate from the absorption front. The absorption area is positioned directly behind the shock wave, the original heating of the surroundings being sufficient to initiate the absorption process. The speed of propagation of the plasma is then determined mainly by the nature and density of the gas in the impact area and the intensity which it has absorbed.

When the intensity of the beam becomes very high (I>1 GW/cm$^2$) the energy transfer process results mainly from the heat conduction and the radiation, which become more effective than the heating by shock wave. The interaction plasma then reaches a very high temperature, and reemits an intense UV radiation which heats the cold gas surrounding the operation. The result is that the gas becomes absorbent in its turn, ionises rapidly and reaches the plasma state. In this case, the speed of the wave depends on the internal energy of the gas due to its absorption of the laser intensity.

In the process of dismantling cutting by power laser, without assistance gas in accordance with the invention, the creation of the impact plasma moving in the vicinity of the surface of a metallic target causes an alteration in the energy coupling, which gives a combustion wave in the case where the speed of movement of the plasma (but not of the laser beam) at the level of the impact is subsonic, and a detonation wave when the speed of movement of the interaction plasma is supersonic.

In the cutting operation, there exist three types of oscillation between which it is possible to establish a compromise in order to enable the impact plasma to evacuate the liquid bath produced after the impact of the beam focused on the surface to be cut (in other words, the solid metal reforms). These oscillations are as follows:

a) the oscillation of the laser beam, b) the oscillation of the impact plasma, c) the oscillation of the molten phase.

It is possible to establish optimum operating conditions for which the different oscillations interfere, in order to give rise to a phenomenon of constructive interference between the different waves produced in the impact plasma and the electromagnetic wave of the laser beam. This makes it possible, under certain conditions and at a certain time in the operating cycle, to improve the energy couplings with the laser beam. It is then possible to use lasers with a much lower power. In addition it is then possible to use lower focused power densities. The constructive interference phenomena cause a detonation wave synchronised with the wave of the laser, which makes it possible to blast the molten material, and therefore to cut.

In order to establish optimum operating conditions, it is possible to take into account a quantity characteristic of the interaction plasma, its fundamental oscillation frequency. This makes it possible to give a first evaluation of the different parameters of the laser beam to be taken into consideration for cutting without added gas, such as the frequency, height and spacing of the laser pulses, for which the interference and resonance phenomena occur, and for which, consequently, the wave synchronised detonation of the plasma-wave of the laser allows discharge of the molten material.

To the fundamental oscillation frequency there corresponds an angular frequency $\omega_{pe}$ of the plasma oscillations, defined by:

$$\omega_p = (n_e q_e^2 / m_e \epsilon_0)^{1/2} \approx 56.4 \times n_e^{1/2}$$

where $q_e$ is the charge of the electron and $n_e$ the electron density of the undisturbed plasma. Strictly speaking, the frequency of the plasma is, in MKS units, the quantity:

$$f_p = \omega_p / 2\pi = 8.976 \times 10^3 \cdot n_e \cdot 8.976 \times n_e^{1/2}$$

In the interaction plasmas produced by power laser on a solid target, the density of the electrons $n_e$ is around $10^{24}$ to $10^{27}$ m$^{-3}$, and the electron temperature $T_e$ is between $10^2$ and $10^3$ eV, which gives a Debye length of around $10^{-7}$ m. In this case, the angular frequency $\omega_p$ of the laser-material interaction plasma oscillations is around $5.64 \times 10^{13}$ rad/secs when $n_e = 10^{24}$ m$^{-3}$, and $1.783 \times 10^{14}$ rad/secs for $n_e = 10^{25}$ m$^{-3}$. Therefore the plasma waves emitted, following the propagation of the collective oscillations of the plasma, have-an angular frequency of between $5.64 \times 10^{13}$ rad/secs and $1.783 \times 10^{15}$ rad/secs.

In the case of dismantling cutting by YAG:Nd laser ($\lambda = 1.06$ $\mu$m), the angular frequency of the electromagnetic wave of the laser radiation is $\omega = 1.778 \times 10^{15}$ rad/secs.

It is found that the phenomenon of resonance between the electromagnetic wave of the laser beam and the detonation and combustion waves of the laser-target interaction plasma occurs in the frequency ranges situated between $5.64 \times 10^{13}$ rad/secs and $5.64 \times 10^{14}$ rad/secs when the electron density varies between $10^{24}$ cm$^{-3}$ and $10^{27}$ cm$^{-3}$. It then causes constructive interference effects: the amplitude of the outgoing wave is amplified. This gives additional energy and improves the energy coupling between the laser beam and the waves emitted by the interaction plasma.

In more general terms, it is sought to obtain an angular frequency of the laser radiation wave close the angular frequency of the plasma oscillations $\omega_p$. For $\omega \approx \omega_p$, the dielectric function (the permittivity of the environment) tends towards 0. In this case, there is resonance between the wave of the laser beam and the wave of the plasma, which amplifies the energy coupling between the laser beam and the material to be cut.

According to one example embodiment, an Nd:YAG laser source operating in pulsed mode, with a focal distance of 500 mm, was used. The parameters of the pulses were as follows: 120 Joules per pulse, repetition frequency 10 Hertz, power of the source 1200 Watts. The head 8 allowed focusing at a distance between 0 and 10 meters, the fixed or variable focal length (for example 0.5 to 5 meters) was moved by a robotised arm. Operating in pulsed mode made it possible to cut metal sheets with a thickness of 16 mm, made from 316L stainless steel, with a focal distance of 200 mm, without added gas, the speed of movement of the head being around 5 cm/min. The cutting kerves obtained were very fine, with a width of around 1.5 mm for a sample with a thickness of 16 mm. It was also possible to cut sheets with a thickness of 5 mm, at a focal distance of 1 meter, the other parameters being the same as above. This is because the kerf quality obtained is comparable to that obtained in the case of a conventional cutting device, using an assistance gas (production cutting).

Examples of comparative cutting trials were carried out with different configurations, on the one hand conventional configurations, and on the other hand configurations according to the invention.

A first trial corresponds to the case of traditional cutting, with an oxygen jet expelled at the point of impact of the laser on the surface to be cut. A cut of good quality was obtained: the kerf is narrow (e=1–1.5 mm) and there is no molten metal on the kerf.

Then the assistance gas was eliminated. The laser power was maintained almost continuously, and it was only possible to cut small thickness (around a few mm). The cuts obtained were of very poor quality: the kerf attained a width of 4 mm, it had an irregular geometry and a certain quantity of molten metal remained stuck to the piece.

Finally, a device and method according to the invention were used, whose specifications were given above, in a metal sheet with a thickness of 16 mm (a focal distance of 500 mm). The work was carried out in pulsed mode, at a distance, and the plasma created by the energy of the pulses made it possible to compensate for the absence of assistance gas, and to obtain a deep groove of very good quality (the groove had a width e of around 1 to 1.5 mm).

What is claimed is:

1. A method for dismantling an installation to be dismantled, the method comprising:

emitting laser pulses with an energy of $E \geq 10$ joules;

transmitting the laser pulses by at least one optical fibre, in the direction of a piece of the installation to be dismantled; and focusing of the laser beam onto said piece, by means of a focusing device with a focal distance $f \geq 50$ cm, the laser beam having a radiation lying in a frequency range lying at least partly between $5.64 \times 10^{13}$ rad.secs$^{-1}$ and $5.64 \times 10^{14}$ rad.secs$^{-1}$.

2. The method as claimed in claim 1, wherein the distance between the end of the fibre and the piece is assessed.

3. The method as claimed in claim 1, wherein the position of the end of the fibre is controlled.

4. The device as claimed in claim 1, the end of the optical fibre forms part of a cutting head.

5. The device as claimed in claim 1, also having means of controlling the position of the end of the fibre and means of controlling the focusing of the beam.

6. The method as claimed in claim 3, wherein the focusing of the beam is controlled.

* * * * *